(12) United States Patent
Brittingham et al.

(10) Patent No.: US 7,568,882 B2
(45) Date of Patent: Aug. 4, 2009

(54) IMPINGEMENT COOLED BUCKET SHROUD, TURBINE ROTOR INCORPORATING THE SAME, AND COOLING METHOD

(75) Inventors: Robert Alan Brittingham, Piedmont, SC (US); Edward Durell Benjamin, Simpsonville, SC (US); Brian Peter Arness, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 453 days.

(21) Appl. No.: 11/652,483

(22) Filed: Jan. 12, 2007

(65) Prior Publication Data

US 2008/0170946 A1 Jul. 17, 2008

(51) Int. Cl.
*F01D 5/08* (2006.01)
*F01D 5/18* (2006.01)

(52) U.S. Cl. .................. 415/1; 415/115; 415/116; 416/92; 416/97 R

(58) Field of Classification Search ............... 415/1, 415/115, 116; 416/92, 97 R
See application file for complete search history.

(56) References Cited

U.S. PATENT DOCUMENTS

| 4,127,358 A | 11/1978 | Parkes |
| 4,948,338 A * | 8/1990 | Wickerson ............ 416/92 |
| 5,482,435 A | 1/1996 | Dorris et al. |
| 6,340,284 B1 * | 1/2002 | Beeck et al. ............ 415/115 |
| 6,499,950 B2 * | 12/2002 | Willett et al. ........... 416/97 R |
| 6,761,534 B1 | 7/2004 | Willett |

OTHER PUBLICATIONS

Brittingham et al U.S. Appl. No. 11/447,910, filed Jun. 7, 2006.

* cited by examiner

*Primary Examiner*—Igor Kershteyn
(74) *Attorney, Agent, or Firm*—Nixon & Vanderhye, PC

(57) ABSTRACT

A localized directional impingement cooling is used to reduce the metal temperatures on highly stressed regions of the tip shroud.

20 Claims, 7 Drawing Sheets

IMPINGEMENT COOLED BUCKET SHROUD, TURBINE ROTOR INCORPORATING THE SAME, AND COOLING METHOD

BACKGROUND OF THE INVENTION

The present invention relates to a blade for a turbine, e.g. aircraft engine, gas turbine, steam turbine, etc. More specifically, the present invention relates to the cooling of a turbine blade tip shroud. As a non-limiting example the invention and its background are described with reference to a gas turbine.

A gas turbine is typically comprised of a compressor section that produces compressed air. Fuel is mixed with a portion of the compressed air and burned in one or more combustors, thereby producing hot compressed gas. The hot compressed gas is expanded in a turbine section to produce rotating shaft power. The turbine section is typically comprised of a plurality of alternating rows of stationary vanes (nozzles) and rotating blades (buckets). Each of the rotating blades has an airfoil portion and a root portion by which it is affixed to a rotor.

Since the blades are exposed to the hot gas discharged from the combustors, cooling methods are required to obtain a useful design life cycle. Traditionally, blade cooling is accomplished by extracting a portion of the compressed air from the compressor and directing it to the turbine section, thereby bypassing the combustors. After introduction into the turbine section, this cooling air flows through passages formed in the airfoil portions of the blades. Often, radial passages are provided that discharge the cooling air radially outwardly at the blade tip.

On many rotating airfoils, integral tip shrouds are used on the radially outer end of the blade to create an outer surface of the passage through which the hot gases must pass. Having the shroud as a part of the airfoil results in an increase in performance for the engine. As such, it is desirable for the entire outer surface to be covered by the tip shrouds. However, integral shrouds on rotating airfoils are highly stressed parts due to the mechanical forces applied via the rotational speed. The high temperature environment coupled with the high stresses makes it a challenge to design a shroud that will effectively perform over the entire useful life of the remainder of the blade. Two methods for resolving this challenge are to reduce the stress and/or reduce the temperature.

A common method for reducing the stress is to remove a portion of the overhanging shroud (scallop the shroud), thus reducing the load applied. Reducing the tip shroud coverage, however, results in a detriment to engine performance. In addition or in the alternative, cooling air discharging at the blade tip flows over the radially outward facing surface of the shroud so as to provide a measure of film cooling.

BRIEF DESCRIPTION OF THE INVENTION

The present invention proposes to more effectively cool the blade tip shroud by utilizing localized directional impingement cooling to reduce the metal temperature in highly stressed regions of the tip shroud, primarily at but not limited to the fillets between the airfoil and the tip shroud. The invention further provides a method of cooling a tip shroud using such impingement cooling.

Thus the invention may be embodied in a turbine blade comprising: a root portion for fixing said blade to a turbine rotor; an airfoil portion extending longitudinally from said root; at least one airfoil cooling passage extending through said airfoil, said airfoil cooling passage having an inlet for receiving a flow of cooling fluid; a shroud projecting outwardly from said airfoil and having a radially inward facing surface and a radially outward facing surface; a wall defining at least one exit hole for exiting cooling fluid from said airfoil cooling passage; at least one shroud cooling chamber in flow communication with at least one said exit hole, said exit hole being directed towards a target wall surface of said cooling chamber, whereby said exit hole defines an impingement hole for impingement cooling said target wall surface as an impingement zone; and at least one outlet aperture for flowing spent impingement cooling fluid out of said cooling chamber.

The invention may also be embodied in a turbine rotor having a row of turbine blades, at least one of said turbine blades comprising: a root portion for fixing said blade to said turbine rotor; an airfoil portion extending longitudinally from said root; at least one airfoil cooling passage extending through said airfoil, said airfoil cooling passage having an inlet for receiving a flow of cooling fluid; a shroud projecting outwardly from said airfoil and having a radially inward facing surface; a wall defining at least one exit hole for exiting cooling fluid from said airfoil cooling passage; at least one shroud cooling chamber in flow communication with at least one said exit hole, said exit hole being oriented to direct cooling fluid towards a target impingement zone, whereby said exit hole defines an impingement hole for impingement cooling said target impingement zone; and at least one outlet opening for flowing spent impingement cooling fluid out of said cooling chamber.

The invention may further be embodied in method of cooling a gas turbine airfoil having an associated substantially planar shroud extending in a plane substantially perpendicular to the airfoil, the method comprising: a) providing at least one airfoil cooling passage in said airfoil; b) providing at least one cooling chamber in said shroud; c) directing cooling air from the at least one airfoil cooling passage through at least one impingement hole towards a wall surface of the at least one cooling chamber; and d) directing spent impingement cooling air through at least one outlet opening in the cooling chamber.

BRIEF DESCRIPTION OF THE DRAWINGS

These and other objects and advantages of this invention will be more completely understood and appreciated by careful study of the following more detailed description of the presently preferred example embodiments of the invention taken in conjunction with the accompanying drawings, in which.

DETAILED DESCRIPTION OF THE INVENTION

Figure 1:
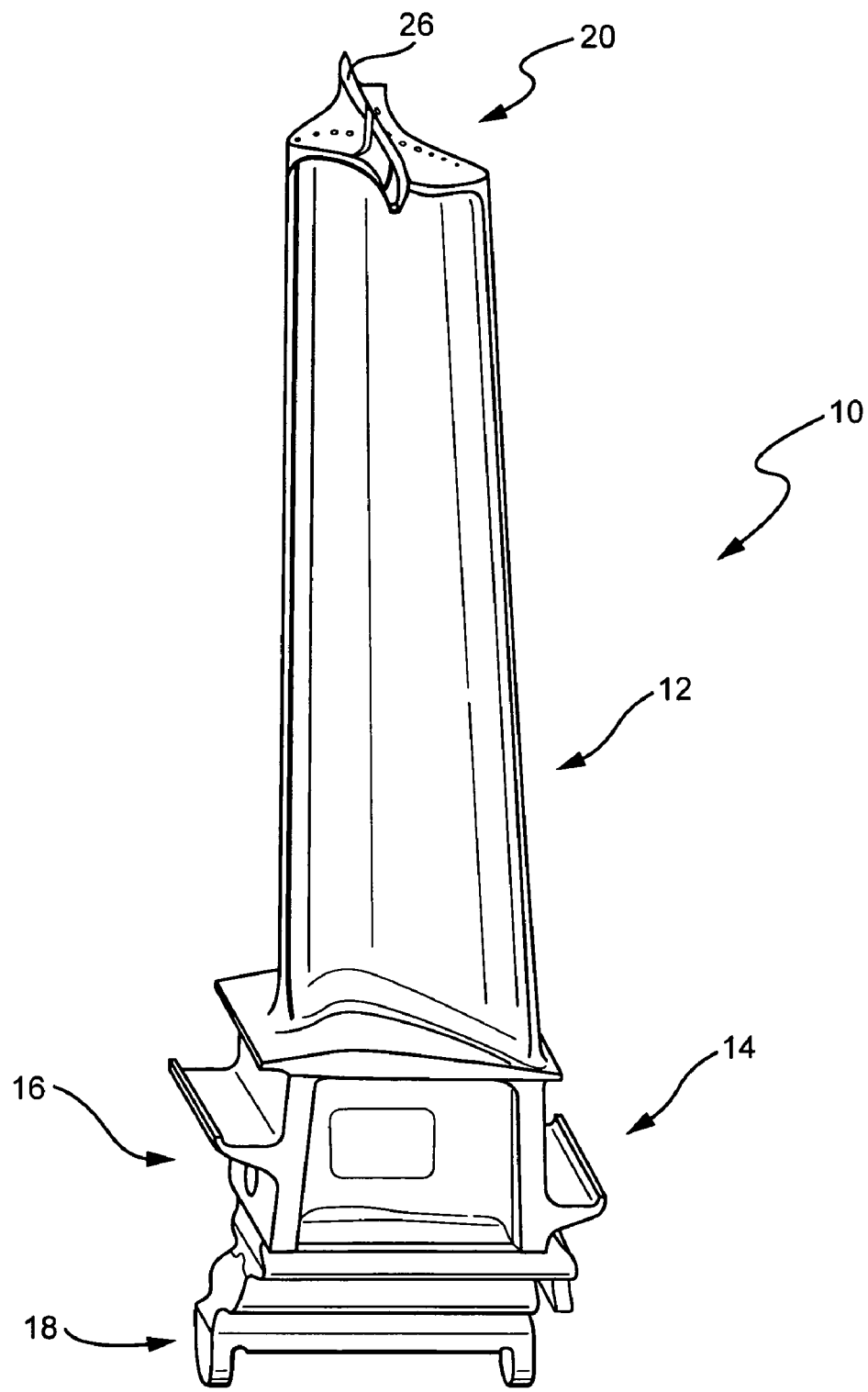
FIG. 1 is a schematic perspective view of a conventional turbine blade with tip shroud.

A typical blade with cooling passages exiting at the blade tip to flow over the tip shroud is schematically illustrated in FIG. 1. As schematically illustrated therein, each turbine blade 10 is comprised of an airfoil portion 12 and a root portion 14. The airfoil portion has a leading edge and a trailing edge. A generally concave pressure surface and a generally convex suction surface extend between the leading and trailing edges on opposing sides of the airfoil. In the illustrated example, the blade root 14 is comprised of a shank 16 and a dovetail 18 to engage a corresponding dovetail groove on the rotor to secure the blade to the rotor.

Figure 2:
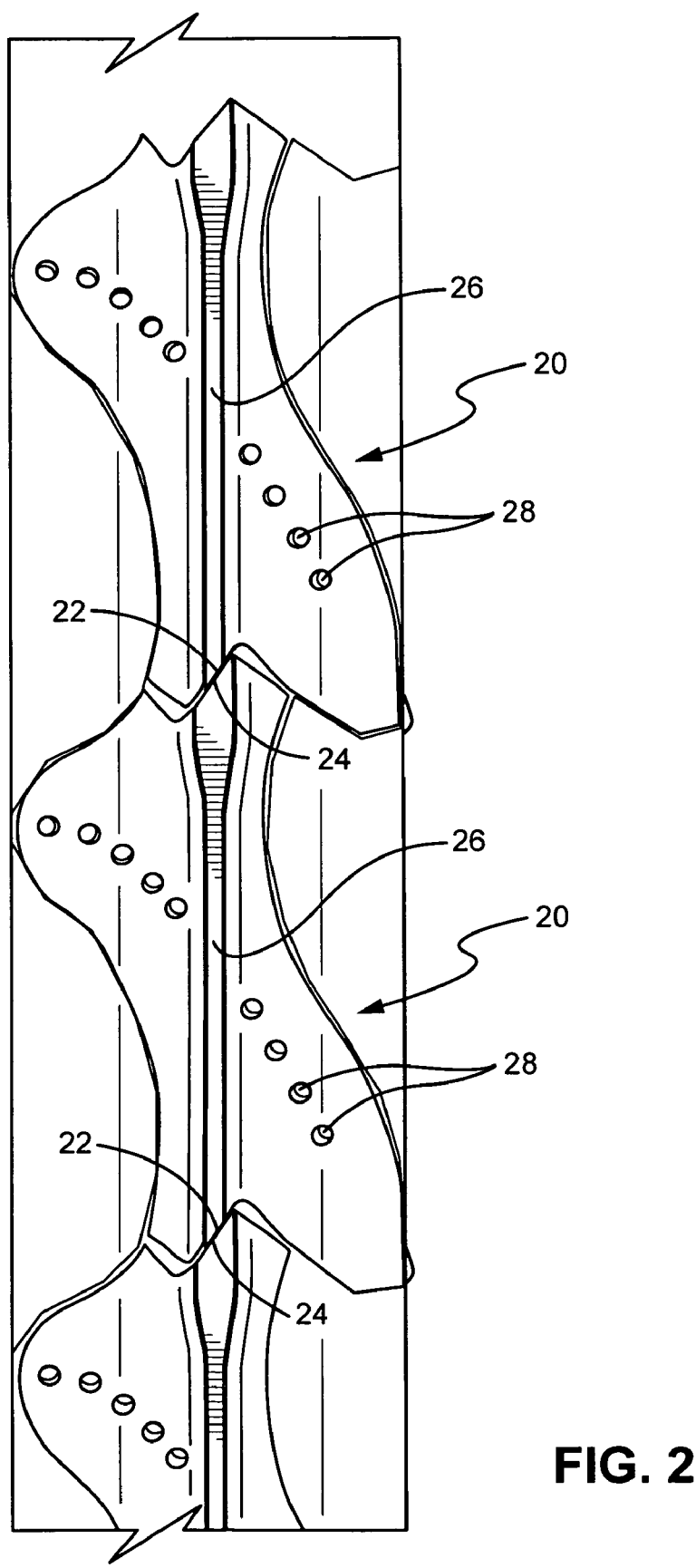
FIG. 2 is a schematic plan view of conventional tip shrouds, illustrating shroud scalloping.

As shown in FIGS. 1 and 2, a shroud 20 is formed at the tip of the airfoil 12 and extends outwardly from the airfoil. The shroud thus has radially inward and radially outward facing surfaces and is exposed to the hot compressed gas flowing through the turbine section. Each shroud has bearing surfaces 22,24 over which it contacts a shroud of an adjacent blade thereby restraining blade vibration. Furthermore, one or more baffle(s) 26 typically extend radially outward from the shroud to prevent leakage of hot gas around the respective blade row. In some conventional bucket blade structures, a plurality of cooling air passages extends radially outwardly through the blade into the blade tip. In other conventional bucket blade structures, serpentine passages are defined in the airfoil. As shown in FIG. 2, radial cooling air passages conventionally terminate at air discharge holes 28 that allow the cooling air to discharge at the radially outward surface of the shroud. Although nine holes 28 are illustrated in FIG. 2, more or fewer passages may be utilized.

The cooling methods utilized in designs to date have been primarily convective in nature, relying on channel flow to provide cooling on the inside of the part. Impingement is widely used in blades at the leading edge of airfoils, less commonly to cool the convex and concave sides of the airfoil, and also less commonly to cool the trailing edges. The invention proposes a novel design for cooling a tip shroud of an industrial gas turbine or aircraft engine blade. More specifically, localized directional impingement cooling is utilized to reduce the metal temperature in highly stressed regions of the tip shroud, primarily the fillet between the airfoil and the tip shroud. This reduction in operating temperature provides an increase in useful part life or allows the same part to operate in a hotter environment without a detriment to useful life.

Figure 3:
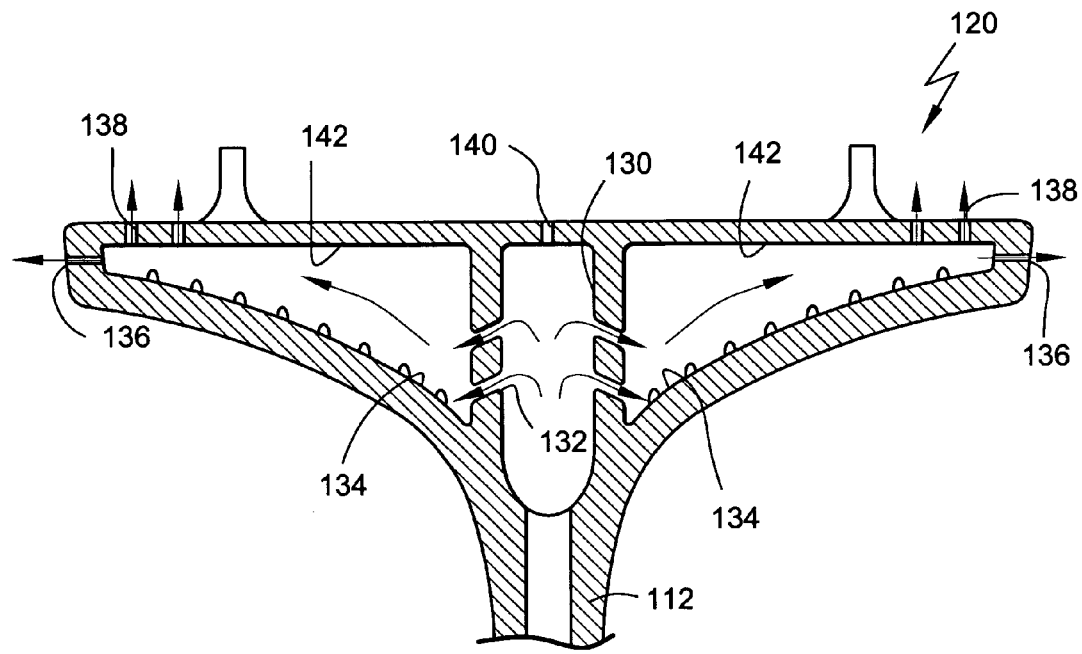
FIG. 3 is a schematic cross-sectional view of an example embodiment of the invention.
Figure 4:
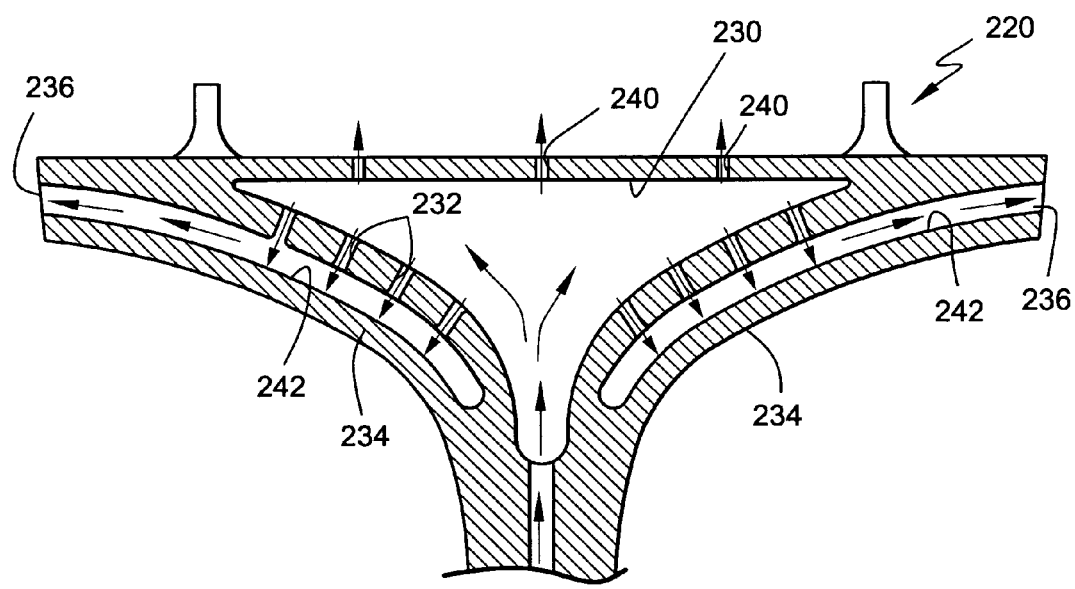
FIG. 4 is a schematic cross-sectional view of another example embodiment of the invention.

There are multiple methods by which impingement cooling may be created in a tip shroud. One example method is to form the impingement holes through an integral part of the blade. These holes may be cast in the part or may be created in the part by machining methods after the casting is formed. Two examples of impingement targeting the airfoil-to-shroud fillet in an integral impingement bridge are shown in FIG. 3 and FIG. 4. FIG. 3 depicts impingement into a mostly open cooling chamber 142, of the shroud, whereas FIG. 4 depicts impingement into a cooling chamber in the form of a narrow channel 242 which would provide excellent channel flow heat transfer downstream of the impingement zone. It is to be appreciated, however, that other impingement/flow configurations may be provided.

Referring to the schematic cross-sectional view of FIG. 3, in an example embodiment, a sealed or mostly sealed chamber 130 inside the tip shroud 120 is utilized, connected to the cooling air from the airfoil 112, as a source of impingement flow. In an example embodiment, this internal chamber 130 is sealed sufficiently such that it may be pressurized. Thus, in a conventional manner, air is taken into the blade, e.g., near the dovetail or shank area, flows through the shank and into and along the airfoil 112 toward the tip shroud 120.

In the illustrated example of FIG. 3, the air flows from the airfoil into the pressurized chamber 130 inside the tip shroud.

The air is then forced from the pressurized chamber through at least one impingement hole 132, directed at a desired location, the impingement zone 134, inside the tip shroud 120. FIG. 3 represents an embodiment of tip shroud impingement cooling in which the airfoil to shroud fillet 134 is the target impingement zone. However, impingement holes may be directed to impingement zones at other tip shroud locations. As will be appreciated, impingement provides a superior form of heat transfer for a localized region as compared with channel flow. The FIG. 3 embodiment further provides turbulators within the cooling chamber(s) 142, e.g., in the fillet region to further enhance heat transfer to the cooling fluid. In an example embodiment, the total cross-sectional area of the impingement holes is smaller than the airfoil coolant passage(s) in order to pressurize the plenum 130. While this provides superior impingement heat transfer, it is not required. It is possible for the impingement hole area to be larger than the airfoil coolant passage area and have the impingement still function, albeit at a reduced performance.

The post-impingement air flows from the impingement zone 134 through cooling chamber(s) 142 to one or more exit apertures, for example exit apertures 136,138, and into the main gas stream. Cooling air may also exit at 140, directly from chamber 130. Although at least one plenum 130 is illustrated in the FIG. 3 embodiment, it is to be understood that it would be possible to have the airfoil coolant passage(s) serve as this plenum. The impingement holes would then originate from the airfoil coolant passage and direct coolant to outer chamber(s).

Referring now to the schematic cross-sectional view of FIG. 4, in another example embodiment, a sealed or mostly sealed chamber 230 inside tip shroud 220 is utilized so that the impingement cooling through impingement holes 232 is directed over an impingement zone 234, that may be larger than that of the FIG. 3 embodiment. Furthermore, the post impingement cooling air is channeled through cooling chambers or passages 242 which provide excellent channel flow heat transfer downstream of impingement zone 234. The exhaust cooling air then flows to one or more exit apertures, for example exit apertures 236, and into the main gas stream. Cooling air may also exit at 240, directly from chamber 230. Even further, in any of the above embodiments post impingement cooling air could also exit through the surface on which it is impinging via film holes. Thus, the air is not required to flow through the cooling chamber after impingement.

Figure 5:
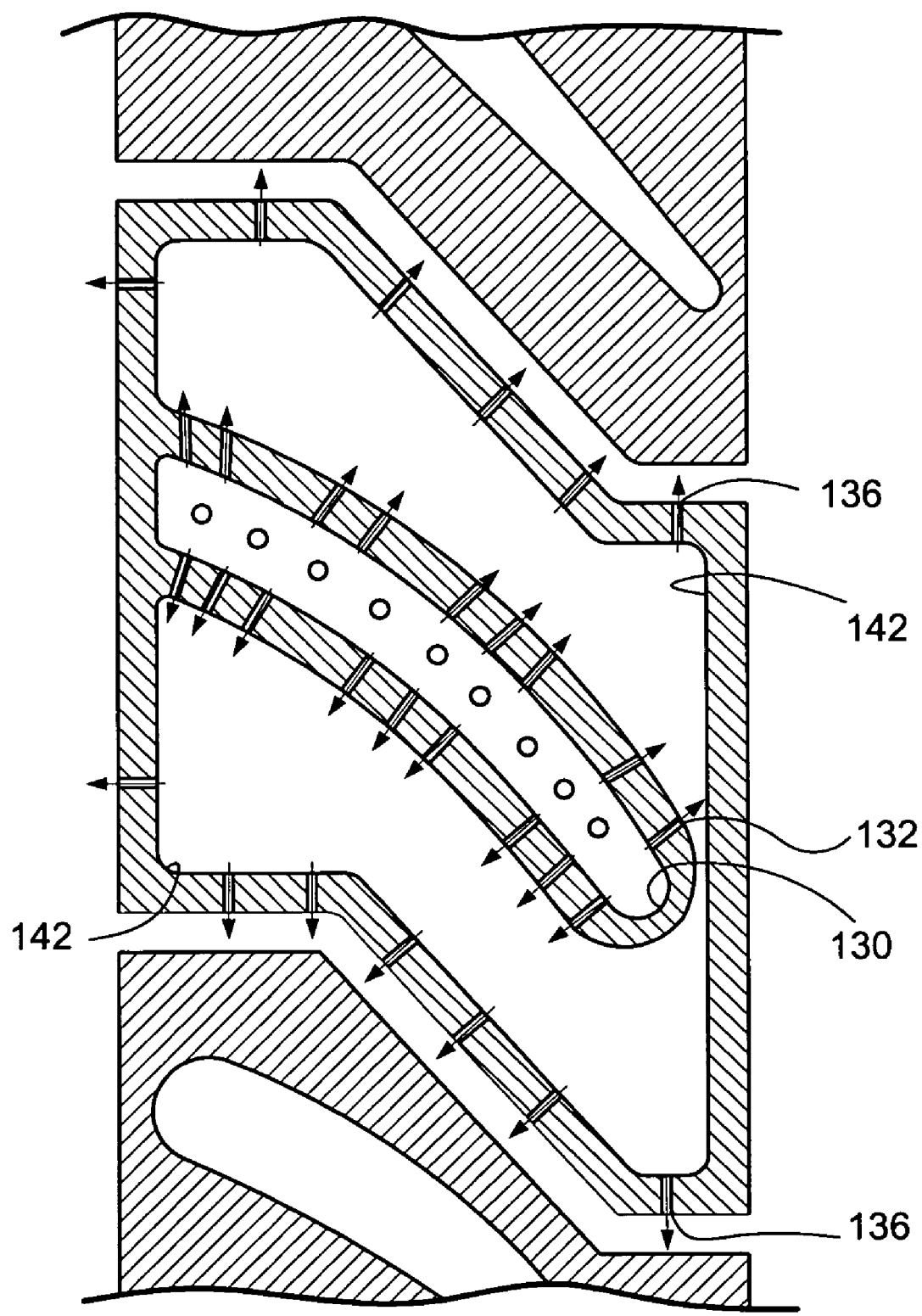
FIG. 5 is a schematic top plan view of the FIG. 3 structure according to a first example embodiment.
Figure 6:
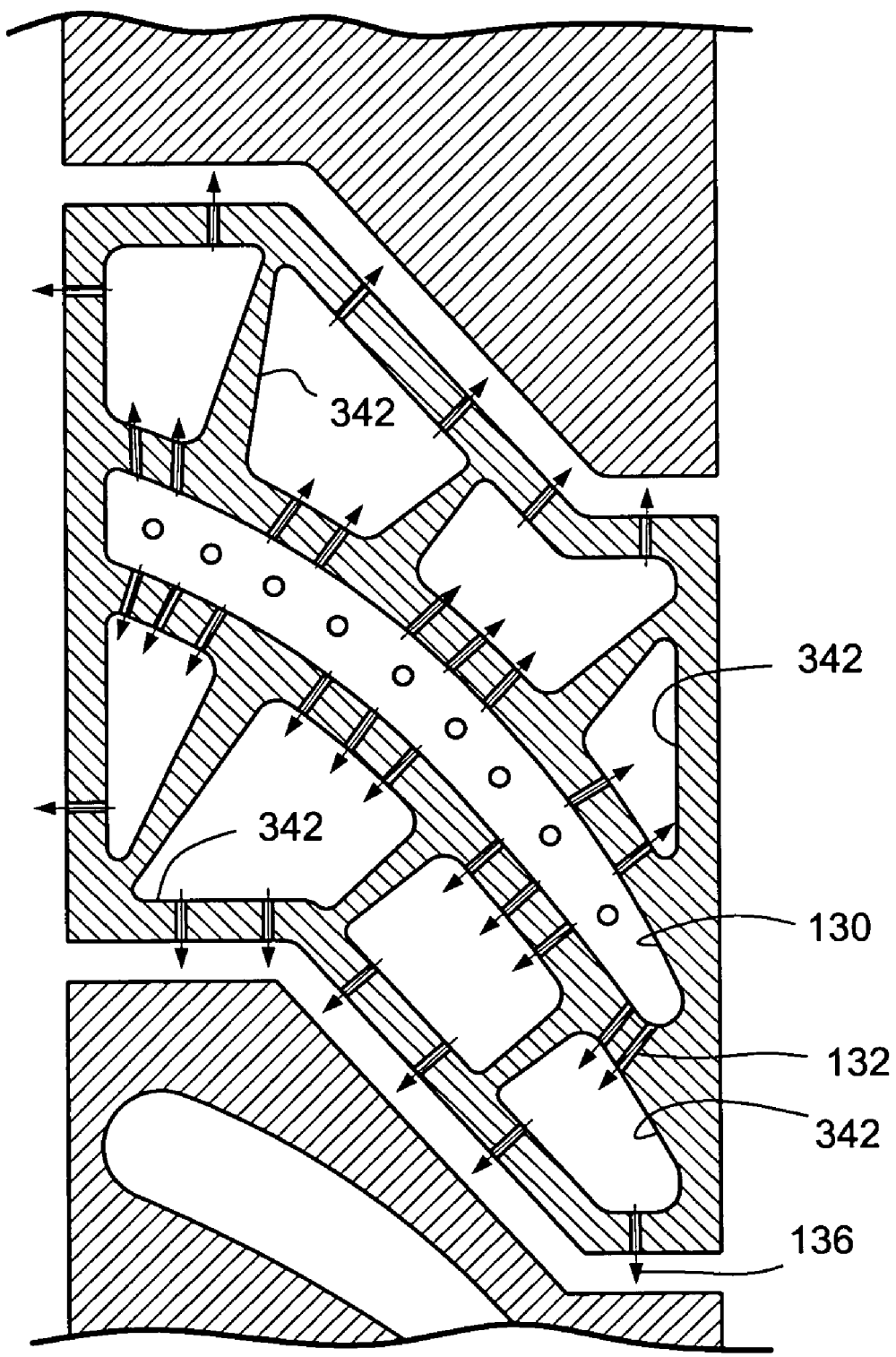
FIG. 6 is a schematic top plan view of the FIG. 3 structure according to a second example embodiment.

Two potential top views of the structure shown in FIG. 3 are schematically illustrated in FIGS. 5 and 6. In FIG. 5, the impingement jets 132 flow into connected cooling chambers 142. FIG. 6 illustrates a second potential embodiment wherein adjacent chambers 342 are not connected. As will be appreciated, any number of chambers 142,242,342 and impingement holes 132,232 may be utilized and the chambers may be isolated or connected as deemed necessary or desirable, for example to provide channel flow downstream of the impingement zone(s).

Figure 7:
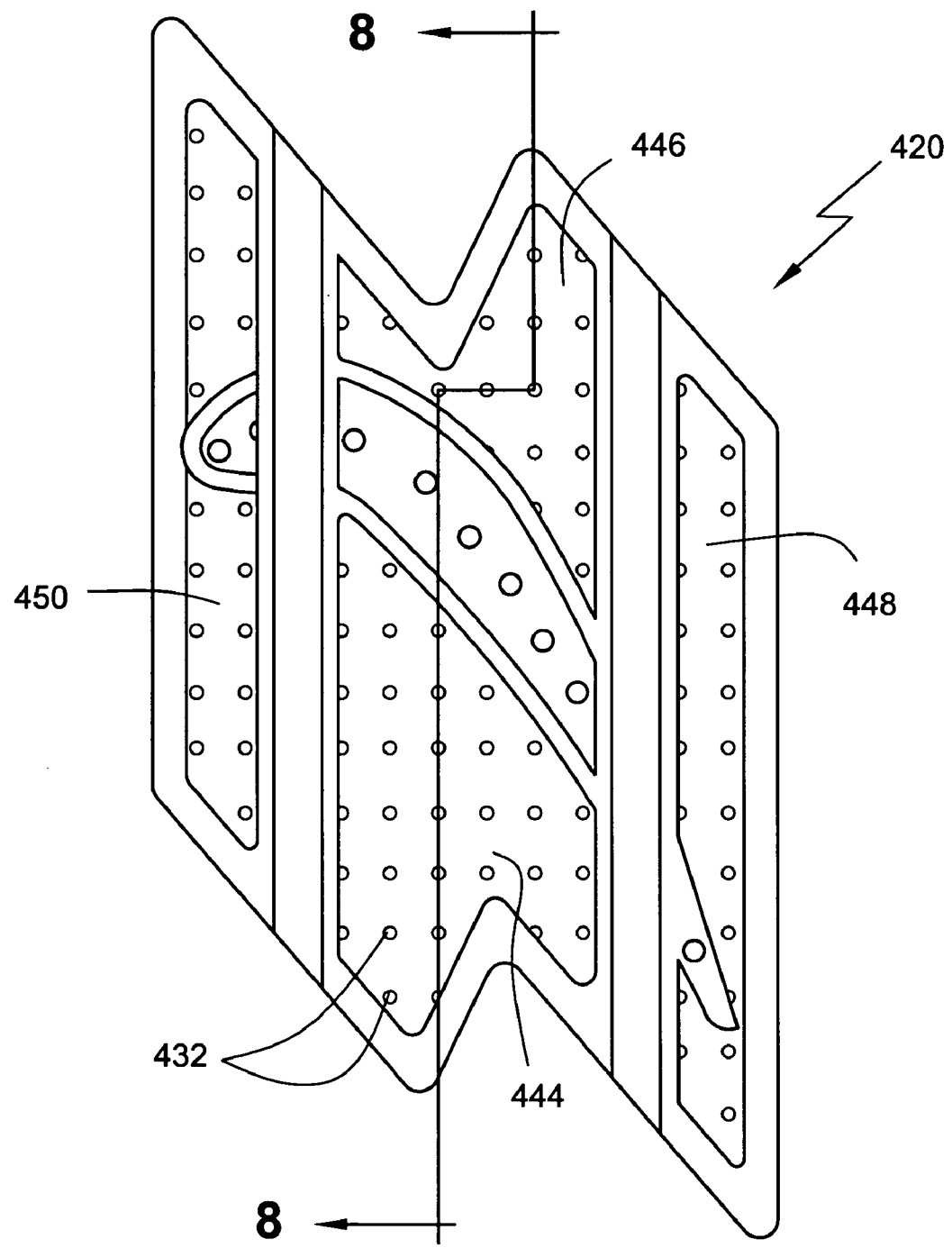
FIG. 7 is a schematic top plan view of a further example embodiment of the invention.
Figure 8:
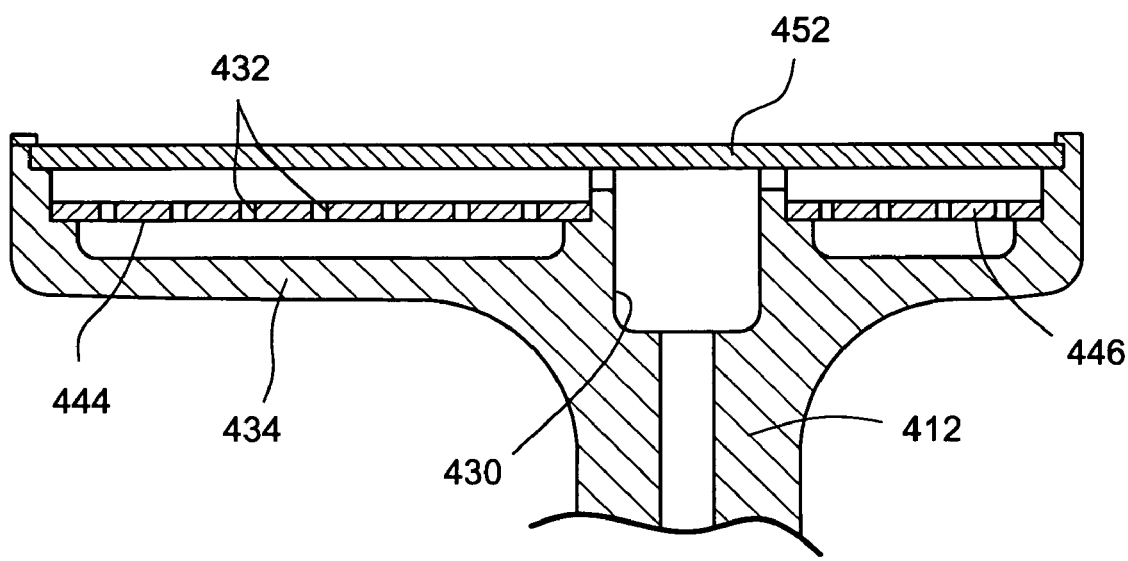
FIG. 8 is cross-sectional view taken along lines 8-8 of FIG. 7.

Another method of creating impingement cooling in a tip shroud is schematically illustrated in FIGS. 7 and 8. In this example embodiment, a non-integral impingement plate(s) 444, 446, 448, 450 are joined to the tip shroud 420. These plates may have any number and pattern of holes to serve as impingement holes 432. In this regard, the holes may be arranged as desired in the impingement plate(s) 444,446,448, 450 to provide optimum cooling design. As in the embodiments of FIGS. 3 and 4, a chamber 430 is formed in the tip shroud 420 and has cooling air supplied to it via the airfoil 412. This chamber serves as the source of impingement air which, in the embodiment of FIGS. 7 and 8, then flows through the impingement plate(s) 444,446,448,450 to impingement cool at the desired impingement zones 434. In the illustrated example embodiment, the pressurized chamber 430 is comprised of a main plenum in direct flow communication with the airfoil cooling passage(s) and auxiliary plenums that over lie the impingement plates. The post-impingement air flows through the shroud to one or more exit apertures (not shown). In the embodiment illustrated in FIGS. 7 and 8, a cover plate 452 is joined to the blade to create the top of the shroud, allowing the separately fabricated impingement plate(s) to be placed inside the shroud. It is to be appreciated, however, that other, integral and non-integral impingement designs could be provided as further alternative embodiments of the invention. Thus, while the embodiment illustrated in FIGS. 7 and 8 provides two plenums, it is possible to use an impingement plate with one or no plenums. The integral wall with impingement holes (as shown in FIGS. 3 and 4) could be replaced with a non-integral impingement plate as an alternative.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while reference has been made in particular to the cooling of a tip shroud, the technology disclosed herein could be used on a shroud that is not located at the tip of the blade. In this regard, some blades have shrouds about mid-length of the airfoil that connect it to its adjacent blade, and the impingement cooling described hereinabove could be incorporated therein.

What is claimed is:

1. A turbine blade comprising:
a root portion for fixing said blade to a turbine rotor;
an airfoil portion extending longitudinally from said root;
at least one airfoil cooling passage extending through said airfoil, said airfoil cooling passage having an inlet for receiving a flow of cooling fluid;
a shroud projecting outwardly from said airfoil and having a radially inward facing surface and a radially outward facing surface;
a wall defining at least one exit hole for exiting cooling fluid from said airfoil cooling passage;
at least one shroud cooling chamber in flow communication with at least one said exit hole, said exit hole being directed towards a target wall surface of said cooling chamber, whereby said exit hole defines an impingement hole for impingement cooling said target wall surface as an impingement zone; and
at least one outlet aperture for flowing spent impingement cooling fluid out of said cooling chamber.

2. A turbine blade as in claim 1, comprising at least one plenum in flow communication with said airfoil cooling passage so as to receive cooling fluid therefrom, and wherein said wall is a wall of said plenum.

3. A turbine blade as in claim 2, wherein a total cross-sectional area of the exit holes from said plenum is less than a total cross-sectional area of the flow communication between the plenum and the airfoil cooling passage, whereby in-flow of cooling fluid pressurizes said at least one plenum.

4. A turbine blade as in claim 1, wherein said wall having said at least one exit hole is integrally formed with said shroud.

5. A turbine blade as in claim 1, wherein said target wall surface comprises an inner wall surface of a fillet between the airfoil and shroud.

6. A turbine blade as in claim 1, wherein said shroud has a bearing surface for engaging a shroud of an adjacent blade.

7. A turbine blade as in claim 3, wherein at least one said outlet aperture is disposed adjacent said bearing surface.

8. A turbine blade as in claim 2, wherein said plenum is comprised of a main plenum and an auxiliary plenum, and wherein said auxiliary plenum is in flow communication with said cooling chamber via an impingement plate having a plurality of impingement holes defined therethrough.

9. A turbine rotor having a row of turbine blades, at least one of said turbine blades comprising:
a root portion for fixing said blade to said turbine rotor;
an airfoil portion extending longitudinally from said root;
at least one airfoil cooling passage extending through said airfoil, said airfoil cooling passage having an inlet for receiving a flow of cooling fluid;
a shroud projecting outwardly from said airfoil and having a radially inward facing surface;
a wall defining at least one exit hole for exiting cooling fluid from said airfoil cooling passage;
at least one shroud cooling chamber in flow communication with at least one said exit hole, said exit hole being oriented to direct cooling fluid towards a target impingement zone, whereby said exit hole defines an impingement hole for impingement cooling said target impingement zone; and
at least one outlet opening for flowing spent impingement cooling fluid out of said cooling chamber.

10. A turbine rotor as in claim 9, comprising at least one plenum in flow communication with said airfoil cooling passage so as to receive cooling fluid therefrom, and wherein said wall is a wall of said plenum.

11. A turbine rotor as in claim 10, wherein a total cross-sectional area of the exit holes from said plenum is less than a total cross-sectional area of the flow communication between the plenum and the airfoil cooling passage, whereby in-flow of cooling fluid pressurizes said at least one plenum.

12. A turbine rotor as in claim 9, wherein said target impingement zone comprises an inner wall surface of a fillet between the airfoil and shroud.

13. A turbine rotor as in claim 9, wherein said plenum is in flow communication with said cooling chamber via a plurality of impingement holes in a partition wall therebetween.

14. A turbine rotor as in claim 9, wherein said shroud has a bearing surface for engaging a shroud of an adjacent blade in said row of turbine blades.

15. A turbine rotor as in claim 14, wherein at least one said outlet opening is disposed adjacent said bearing surface.

16. A turbine rotor as in claim 9, wherein there are a plurality of impingement cooling chambers defined in said shroud.

17. A turbine rotor as in claim 10, wherein said plenum is comprised of a main plenum and an auxiliary plenum, and wherein said auxiliary plenum is in flow communication with said cooling chamber via an impingement plate having a plurality of impingement holes defined therethrough.

18. A method of cooling a gas turbine airfoil having an associated substantially planar shroud extending in a plane substantially perpendicular to the airfoil, the method comprising:
a) providing at least one airfoil cooling passage in said airfoil;
b) providing at least one cooling chamber in said shroud;
c) directing cooling air from the at least one airfoil cooling passage through at least one impingement hole towards a wall surface of the at least one cooling chamber; and d) directing spent impingement cooling air through at least one outlet opening in the cooling chamber.

19. The method of claim 18, wherein step d) is carried out by providing at least one cooling air exhaust hole in said shroud, opening at a peripheral edge of the shroud.

20. The method of claim 18, wherein at least one plenum is provided in the shroud, cooling air is supplied to said at least one plenum from said at least one airfoil cooling passage, and said impingement holes are defined in a wall of said at least one plenum.

* * * * *